US012408005B2

(12) United States Patent
Henry et al.

(10) Patent No.: US 12,408,005 B2
(45) Date of Patent: Sep. 2, 2025

(54) DIFFERENTIATED TIME-DIFFERENCE OF ARRIVAL FOR ULTRA-WIDEBAND (UWB)

(71) Applicant: Cisco Technology, Inc., San Jose, CA (US)

(72) Inventors: Jerome Henry, Pittsboro, NC (US); Indermeet Singh Gandhi, San Jose, CA (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 450 days.

(21) Appl. No.: 17/929,791

(22) Filed: Sep. 6, 2022

(65) Prior Publication Data

US 2023/0388747 A1 Nov. 30, 2023

Related U.S. Application Data

(60) Provisional application No. 63/347,327, filed on May 31, 2022.

(51) Int. Cl.
*H04W 4/029* (2018.01)
*H04W 4/02* (2018.01)
*H04W 4/021* (2018.01)
*H04W 8/00* (2009.01)

(52) U.S. Cl.
CPC ........... *H04W 4/029* (2018.02); *H04W 4/021* (2013.01); *H04W 4/023* (2013.01); *H04W 8/005* (2013.01)

(58) Field of Classification Search
CPC ..... H04W 4/029; H04W 4/021; H04W 4/023; H04W 8/005; H04W 4/80; H04W 4/02; H04W 4/025; H04B 17/253; H04B 17/27
See application file for complete search history.

(56) References Cited

U.S. PATENT DOCUMENTS

| | | | | |
|---|---|---|---|---|
| 9,609,474 | B2 * | 3/2017 | Huang | H04W 4/029 |
| 11,611,851 | B2 * | 3/2023 | Ylläsjärvi | H04W 4/029 |
| 2006/0029009 | A1 * | 2/2006 | Alapuranen | G01S 11/02 |
| | | | | 370/310 |
| 2010/0279712 | A1 * | 11/2010 | Dicke | H04W 4/029 |
| | | | | 455/457 |

(Continued)

FOREIGN PATENT DOCUMENTS

| | | |
|---|---|---|
| WO | 2014093400 A1 | 6/2014 |
| WO | 2022028387 A1 | 2/2022 |

OTHER PUBLICATIONS

Pestourie, Baptiste "UWB Secure Ranging and Localization", Universite Grenoble Alps, 2020. English; HAL Id: tel-03136561; https://hal.archives-ouvertes.fr/tel-03136561 (183 pgs).

*Primary Examiner* — Andrew Wendell

(74) *Attorney, Agent, or Firm* — Merchant & Gould P.C.

(57) ABSTRACT

Differentiated time-difference of arrival for Ultra-Wideband (UWB) may be provided. A location tracking information for a venue may be broadcasted. Broadcasting the location tracking information may include notifying a user device that a location information is expected from the user device and providing an entity identity of an entity seeking the location information from the user device. A ranging message may then be received from the user device in response to the user device detecting the location tracking information. A position of the user device on the venue may be determined from the ranging message.

15 Claims, 4 Drawing Sheets

(56) References Cited

U.S. PATENT DOCUMENTS

| | | | |
|---|---|---|---|
| 2017/0164145 A1* | 6/2017 | Lipman | G06Q 30/0251 |
| 2017/0347134 A1* | 11/2017 | Bae | H04N 21/238 |
| 2020/0096346 A1* | 3/2020 | Dhandapani | G06Q 10/02 |
| 2020/0221366 A1* | 7/2020 | Palmer | H04N 21/43615 |
| 2022/0006892 A1 | 1/2022 | Perkins et al. | |
| 2022/0066010 A1 | 3/2022 | Henry et al. | |
| 2022/0137204 A1* | 5/2022 | Nguyen | G06F 3/017 |
| | | | 342/28 |
| 2023/0036230 A1* | 2/2023 | Berlocher | H04W 52/0229 |
| 2023/0231591 A1* | 7/2023 | Russell | H04W 4/023 |

* cited by examiner

DIFFERENTIATED TIME-DIFFERENCE OF ARRIVAL FOR ULTRA-WIDEBAND (UWB)

RELATED APPLICATION

This application claims the benefit of U.S. Provisional Application No. 63/347,327, filed May 31, 2022, and titled "A DIFFERENTIATED TIME-DIFFERENCE OF ARRIVAL FOR ULTRA-WIDEBAND," the disclosure of which is hereby incorporated herein by reference.

TECHNICAL FIELD

The present disclosure relates generally to network equipment and location services.

BACKGROUND

Networking architectures have grown increasingly complex in communications environments, particularly mobile networking environments. In some instances, it is useful to determine a mobile device's location within a mobile networking environment. While the Institute of Electrical and Electronics Engineers (IEEE) 802.11 (e.g., Wi-Fi) or Bluetooth ranging techniques may be utilized in some cases to determine mobile device location, such technologies may provide limited location accuracy. Ultra-Wideband (UWB), as defined in IEEE 802.15.4a and 802.15.4z, may offer improved ranging accuracy over Wi-Fi and Bluetooth, however, utilizing a UWB radio or chip for a mobile device creates a battery cost for the device. Accordingly, there are significant challenges with using UWB ranging for mobile devices.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
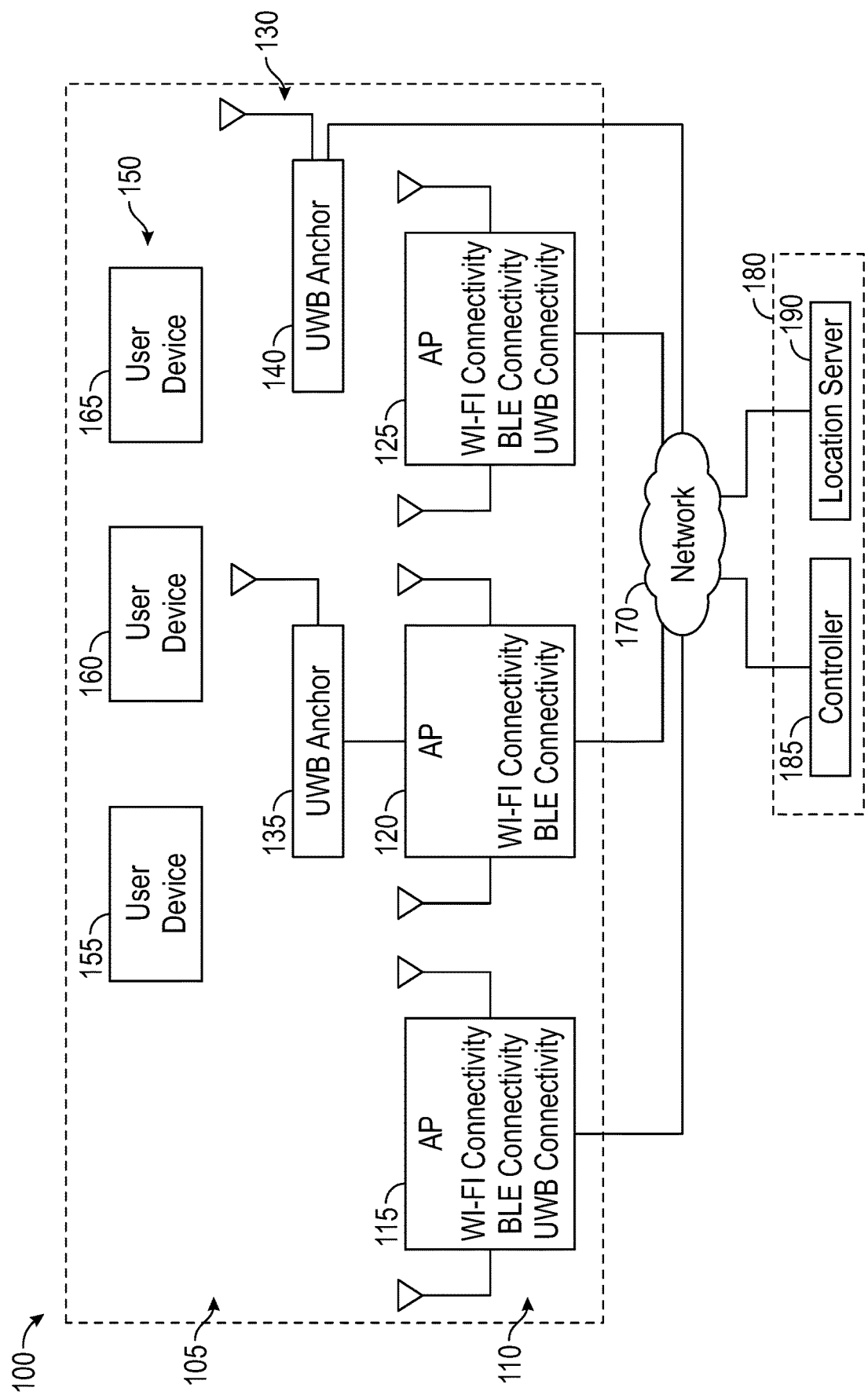
FIG. 1 is a block diagram of an operating environment for providing a differentiated time-difference of arrival for Ultra-Wideband (UWB)

A differentiated time-difference of arrival for Ultra-Wideband (UWB) may be provided. A location tracking information for a venue may be broadcasted. Broadcasting the location tracking information may comprise notifying a user device that a location information is expected from the user device and providing an entity identity of an entity seeking the location information from the user device. A ranging message may then be received from the user device in response to the user device detecting the location tracking information. A position of the user device on the venue may be determined from the ranging message.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A fine Ranging specification (e.g., the FiRa specification) may provide a specification for indoor location tracking. The location tracking in the fine ranging specification may be based on Ultra-Wideband (UWB). In one mode, anchors may be organized in clusters, where a primary anchor of each cluster may send Synchronization (Sync) messages at short intervals. All other anchors in the same cluster may respond to the sync messages in turn. All other anchors of the cluster may indicate a Time of Arrival (ToA) and a Time of Departure (ToD) and may synchronize their respective clocks based on the Synch messages. A user device (i.e., a Station (STA)) on the venue may then listen to these messages. The user device may determine its distance relative to each anchor of the cluster using a Downlink (DL) message Time Difference of Arrival (TDoA) computation (also referred to as a DL mode). The user device then may determine its position on the venue using locations of the anchors of the cluster.

In an Uplink (UL) mode, the position of the user device may need to be determined. The user device may send ranging messages (i.e., UL messages). A Real Time Location Service (RTLS) system behind the anchors may use the TDoA of the ranging messages on each anchor to compute a relative distance of the user device to the anchors and thus its position on the venue. However, the fine ranging specification may not provide a process to preserve an identity of the user device in the UL mode. In addition, the fine ranging specification may not provide a process to restrict availability of the DL message for the TDoA computation to authorized devices. Accordingly, embodiments of the disclosure may provide processes to allow a user device to maintain anonymity while sharing location information at a venue. In addition, embodiments of the disclosure may provide processes to force a user device to share location information in a restricted venue or a restricted area of the venue for example.

FIG. 1 shows an operating environment 100 for providing TDoA for UWB. As shown in FIG. 1, operating environment 100 may comprise a venue 105. Venue 105 may include a plurality of Access Points (APs) 110, for example, a first AP 115, a second AP 120, and a third AP 125. Venue 105 may further comprise a plurality of UWB anchors 130, for example, a first UWB anchor 135 and a second UWB anchor 140. Venue 105 may further comprise a plurality of user devices 150, for example, a first user device 155, a second user device 160, and a third user device 165. Operating environment 100 may further include a network 170 and a control device 180. Control device 180 may include a controller 185 and a location server 190.

Venue 105 may support any density of plurality of user devices 150, and may include any indoor or outdoor area, such as a home, school, campus, office building, conference center, stadium, or other venue or location or portion thereof. Venue 105 may include a restricted area or an admission controlled area. Each of plurality of APs 110 may be positioned at known locations in venue 105 and may facilitate a connection between one or more of plurality of user devices 150 and network 170.

Plurality of APs 110, for example, may communicate with plurality of user devices 150 through Wi-Fi Wireless Local Area Network (WLAN), Bluetooth Low Energy (BLE), or UWB. For example, plurality of APs 110 may include a Wi-Fi chipset for providing Wi-Fi connectivity, a BLE chipset for providing BLE connectivity, and a UWB chipset for providing UWB connectivity. First AP 115 and third AP 125 may include built-in/integrated Wi-Fi connectivity, BLE connectivity, and UWB connectivity. Second AP 120 may include built-in/integrated Wi-Fi connectivity and BLE connectivity but not UWB connectivity. However, second AP 120 may achieve UWB connectivity via first UWB anchor 135 that may be connected to second AP 120.

Each of plurality of UWB anchors 130 may also be positioned at known locations in venue 105, and may receive, send, and process UWB transmissions. Each of plurality of UWB anchors 130 may include other communication capabilities, such as BLE wireless communication capabilities or wired communication capabilities, for example, via a connection to network 170 over IEEE 802.11, Ethernet, or another connection mechanism. First UWB anchor 135 may also be referred to as a peripheral UWB anchor as it may be connected to second AP 120. Second UWB anchor 140 may also be referred to as a standalone UWB anchor. An anchor, for example, may refer to any device configured to detect UWB transmissions from plurality of user devices 150. Therefore, each of first AP 115, third AP 125, and plurality of UWB anchors 130 may be referred to as an anchor.

Plurality of user devices 150 may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), or other similar microcomputer-based device.

Each of plurality of user devices 150 may communicate with one or more of plurality of APs 110 and one or more of plurality of UWB anchors 130. For example, each of plurality of user devices 150 may include Wi-Fi WLAN connectivity for communicating over Wi-Fi WLAN, BLE connectivity for communicating over BLE, and UWB connectivity for communicating over UWB. Plurality of user devices 150 may include a Wi-Fi chipset for providing Wi-Fi connectivity, a BLE chipset for providing BLE connectivity, and a UWB chipset for providing UWB connectivity. Each of plurality of user devices 150 may also include a fine ranging enabled application. The fine ranging enabled application, in an example, may manage UWB connectivity of each of plurality of user devices 150.

Plurality of APs 110, plurality of UWB anchors 130, and plurality of user devices 150 may communicate with control device 180 via network 170. Network 170 may include any communications medium for transmitting information between two or more computing devices. For example, network 170 may include a LAN, a Wide Area Network (WAN), a Virtual Private Network (VPN), Intranet, Internet, hardwire connections, modem connections, wireless connections, or combinations of one or more these items.

Controller 185 may manage operations of plurality of APs 110. For example, controller 185 may facilitate communications involving plurality of user devices 150 through plurality of APs 110. Controller 185 and location server 190 may be separate and physically distinct entities Location server 190 may manage location-related transmissions involving plurality of APs 110, plurality of UWB anchors 130, and plurality of user devices 150. For example, location server 190 may cooperate with plurality of APs 110, plurality of UWB anchors 130, and plurality of user devices 150 to initiate and complete device ranging procedures at venue 105 that provide location measurements to location solutions. Location server 190 may perform location computations, that is, process time, distance, angle, signal strength or other information from one or more of plurality of APs 110, plurality of UWB anchors 130 and plurality of user devices 150. Location server 190 may determine or track a position of a particular one of plurality of user devices 150 on venue 105 and may provide to some other entity seeking that location information.

The elements described above of operating environment 100 (e.g., plurality of APs 110, plurality of UWB anchors 130, plurality of user devices 150, control device 180, controller 185, and location server 190) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
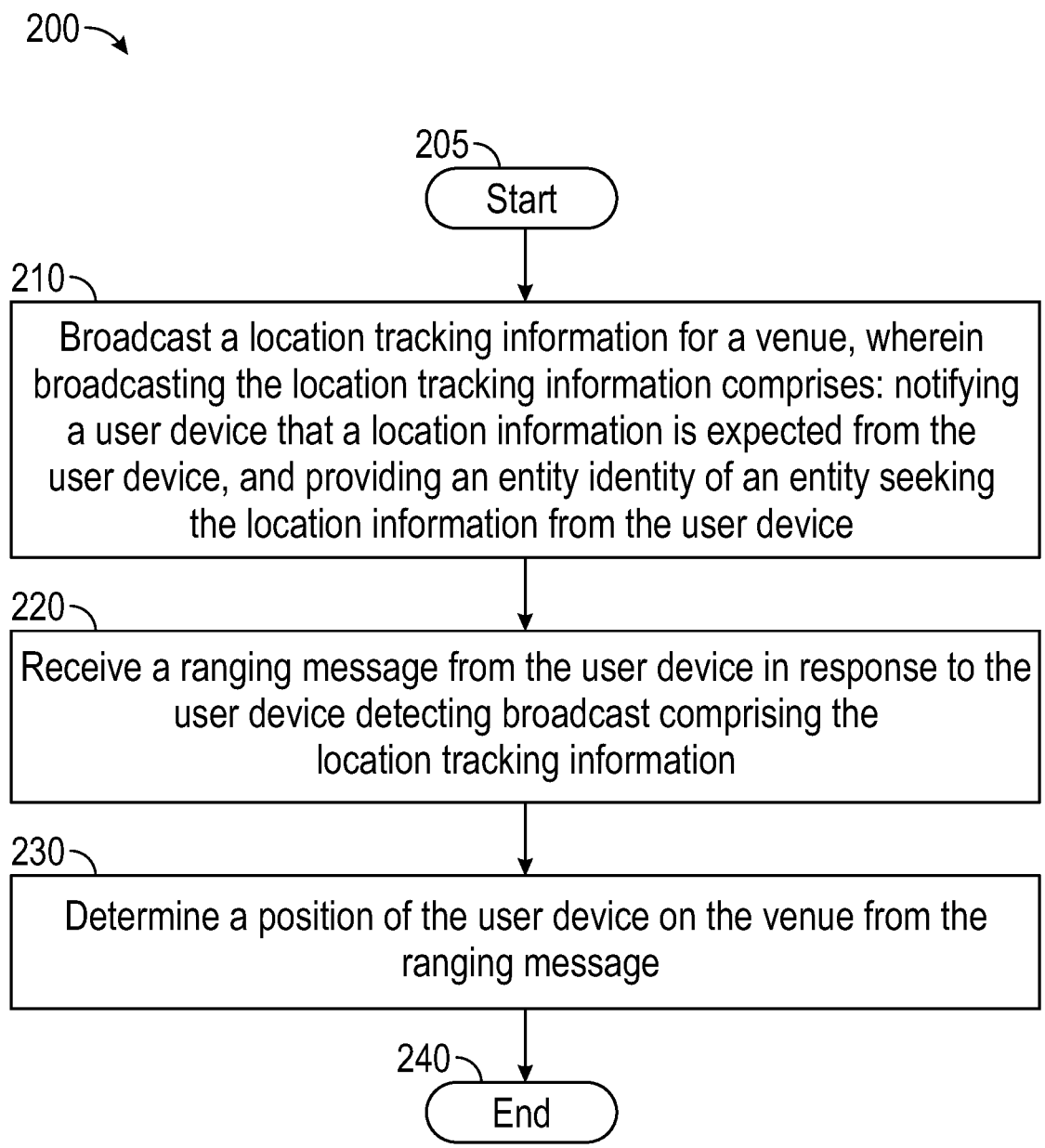
FIG. 2 is a flow chart of a method for receiving location information from a user device in UWB.

FIG. 2 is a flow chart setting forth the general stages involved in a method 200 consistent with an embodiment of the disclosure for receiving location information from a user device in UWB. Although, method 200 is described with reference to UWB, other wireless ranging processes may be used. Method 200 may be implemented using location server 190 as described in more detail above with respect to FIG. 1. In other embodiments, method 200 may be implemented using or one or more of plurality of APs 110 or plurality of UWB anchors 130 as described in more detail above with respect to FIG. 1. Ways to implement the stages of method 200 will be described in greater detail below.

Method 200 may begin at starting block 205 and proceed to stage 210 where location server 190 may broadcast a location tracking information for venue 105. Broadcasting the location tracking information may comprise notifying first user device 155 that a location information is expected from first user device 155 at venue 105. In addition, broadcasting the location tracking information may comprise providing an entity identity of an entity seeking the location information from first user device 155. For example, the fine ranging specification may allow location server 190 to broadcast operational parameters of UWB over Out of Band (OOB) channels (for example, BLE or Wi-Fi) through plurality of APs 110. However, the fine ranging specification may limit this advertisement to information that UWB is available in venue 105 for location purposes (along with a UL mode or a DL mode) and Physical (PHY) parameters (e.g., modulation, channel, etc.)

Consistent with embodiments of the disclosure, location server 190 may broadcast a location tracking type information in an information element of a broadcast message. The tracking type information may include a DL mode or a UL mode. For example, the information element of the broadcast message may notify or inform first user device 155 that location information is expected for first user device 155 along with the UL mode. Values in the information element may include, for example, company assets, individual user devices, analytics, controlled areas, lost devices, or others. Location server 190 may also broadcast the entity identity (i.e., a Company ID) value. The entity identity value may be a string representing a venue administrator. The string may be literal (e.g., Company Name) or a code (e.g., OB87DS). The tracking type information may be broadcasted in a BLE signal frequency range or a Wi-Fi signal frequency range.

From stage 210, where location server 190 broadcasts the location tracking information for venue 105, method 200 may advance to stage 220 where location server 190 may receive a ranging message from first user device 155 in response to first user device 155 detecting broadcast comprising the location tracking information. The ranging message may be a One Way Ranging (OWR) message and may be received in a UWB channel or in a UWB signal frequency range.

First user device 155 may compare the entity identity received in the location tracking information with a device entity identity. The device entity identity may be stored on first user device 155 on the fine ranging enabled application. If there is match between the received entity identity and the device entity identity, first user device 155 may consider itself to be an asset of the venue administrator and may start sending the OWR messages. The OWR message, when first user device 155 is determined to be an asset of the venue administrator, may include an user device identification information, for example, a Media Access Control (MAC) address of first user device 155.

If there is no match between the received entity identity and the device entity identity, first user device 155 may determine if the fine ranging enabled application has allowed to share its location. For example, a user associated with first user device 155 may have registered first user device 155 with the entity administrator to share its location in exchange for rewards or coupons in a non-asset mode. The user may have enabled in the fine ranging enabled application to share location in exchange for the rewards in the non-asset mode. In response to determining that the fine ranging enabled application has allowed to share its location, first user device 155 may start sending the OWR messages.

First user device 155 may only allow anonymous location information sharing in the non-asset mode. Anonymous location information sharing may allow location server 190 to determine a general foot traffic pattern at venue 105, but without user device identification. In the non-asset mode, the fine ranging enabled application on first user device 155 may generate a first random MAC address, a first random timer, and a second random timer. The first random timer may have a first time duration that may, for example, be less than five seconds and the second random time may have a second time duration which may, for example, be between three minutes and twelve minutes. However, other time durations are possible for both the first random timer and the second random timer.

First user device 155 may send OWR messages using the first random MAC address in the first time duration. At the end of the first time duration or the first timer, first user device 155 may become silent. That is, first user device 155 may not send OWR messages in the second time duration. At the end of the second time duration, first user device 155 may determine if it is still within the UWB range (recognized by the entity identity in the location tracking information broadcasts). If first user device 155 is still within the UWB range at the end of the second time duration, the fine ranging enabled application may generate a new MAC address and new timers. For example, the fine ranging enabled applications may generate a second random MAC address for a third time duration that may begin at the end of the second time duration. The rewards may be received based on a length of the first time duration and the third time duration.

Once location server 190 receives the ranging message from first user device 155 in stage 220, method 200 may continue to stage 230 where location server 190 may determine a position of first user device 155 on venue 105 from the ranging message. For example, location server 190 may determine the position of first user device 155 on venue 105 based on the TDoA of the ranging messages received by one or more the plurality of anchors of venue 105. Once location server 190 determines the position of first user device 155 at stage 230, method 200 may then end at stage 240.

In some venues 105 (e.g., a restricted area, a hazardous area, etc.), sharing location information may be mandatory or required for first user device 155. Mandatory location information sharing may be expressed in the information element of broadcasts comprising the location tracking information. Upon detecting a venue mandated location information sharing, the fine ranging enabled application may trigger first user device 155 to send the ranging message with the user device identification information.

Figure 3:
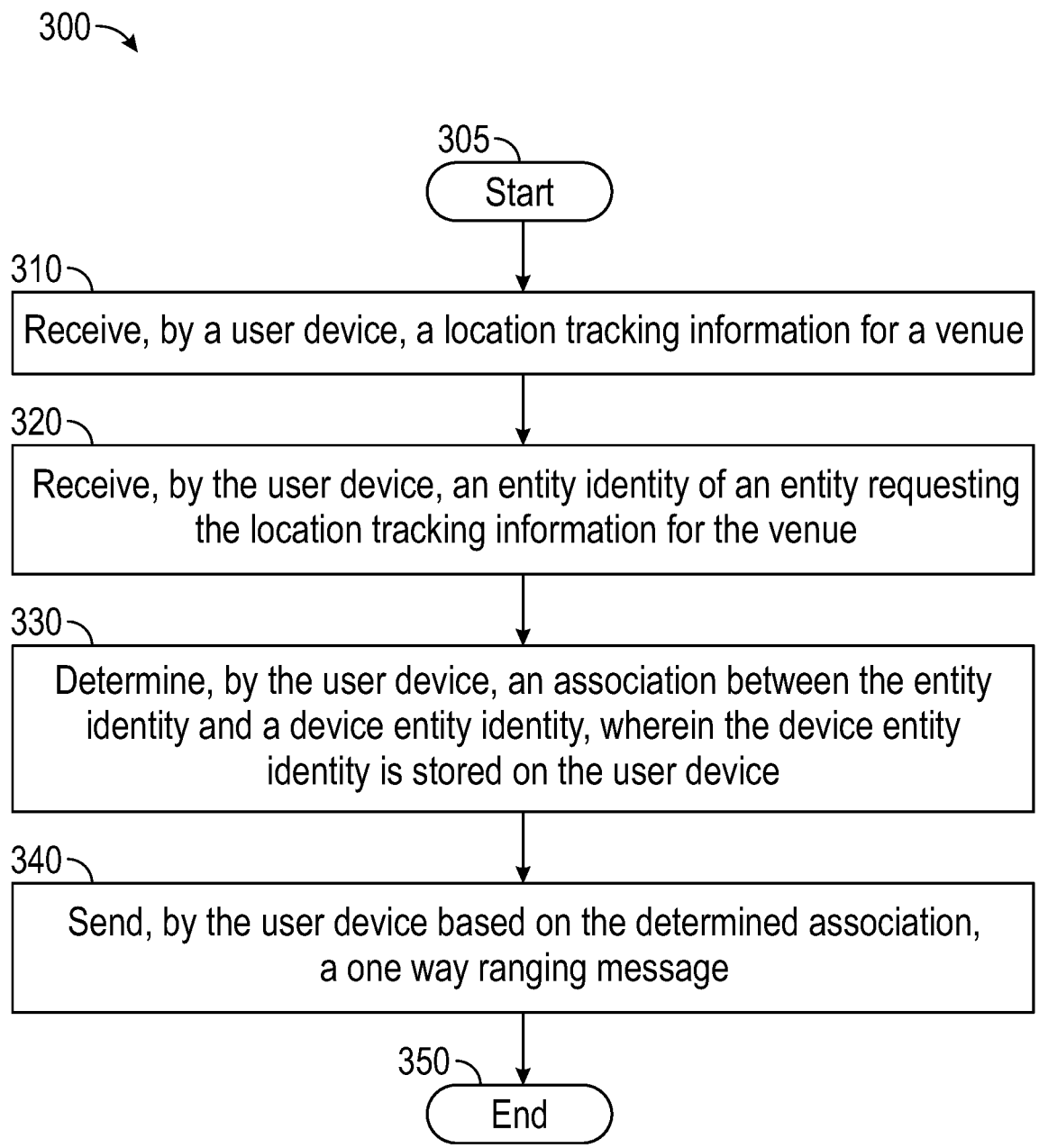
FIG. 3 is a flow chart of a method for providing location tracking information in UWB.

FIG. 3 is a flow chart setting forth the general stages involved in a method 300 consistent with an embodiment of the disclosure for providing the location tracking information in UWB. Although, method 300 is described with reference to UWB, other wireless ranging processes may be used. Method 300 may be implemented using any of plurality of user devices 150, for example, first user device 155, as described in more detail above with respect to FIG. 1. Ways to implement the stages of method 300 will be described in greater detail below.

Method 300 may begin at starting block 305 and proceed to stage 310 where first user device 155 may receive the location tracking information for venue 105. First user device 155 may receive the location tracking information from any of plurality of APs 110 in a broadcast message or an information element of the broadcast message. First user device 155 may receive the location tracking information in an OOB signal frequency range, for example, a BLE signal frequency range and a Wi-Fi signal frequency range.

From stage 310, where first user device 155 receives the location tracking information for venue 105, method 300 may advance to stage 320 where first user device 155 may receive the entity identity of an entity requesting the location tracking information for venue 105. First user device 155 may receive the entity identity as an entity identity value in the information element of the broadcast message. The entity identity value may be a string representing a venue administrator. The string may be literal (e.g., Company Name) or a code (e.g., OB87DS). The tracking type information may be broadcasted in a BLE signal frequency range or a WiFi signal frequency range.

Once first user device 155 receives the entity identity in stage 320, method 300 may advance to stage 330 where first user device 155 may determine an association between the received entity identity and the device entity identity. For example, first user device 155 may retrieve the device entity identity from the fine ranging enabled application. First user device 155 may then compare the received entity identity with the device entity identity and determine that it is the asset of the venue administrator. In some embodiments, first user device 155 may determine that it is not the asset of the venue administrator, but is registered with the venue administrator. In some other examples, first user device 155 may determine that it is not associated with the venue administrator.

After first user device 155 determines the association between the entity identity and the device entity identity in stage 330, method 300 may advance to stage 340 where first user device 155 may send the OWR message based on the determined association. For example, in response to determining that it is the asset of the venue administrator, first user device 155 may send the OWR message with the user device identification information. In response to determining that it is not the asset of the venue administrator but is registered with the venue administrator, first user device 155 may send OWR messages without user device identification information. For example, first user device 155 may send OWR messages with a first random MAC address for a first time duration. Once first user device 155 sends the OWR message in stage 340, method 300 may then end at stage 350.

In some embodiments, first user device 155 may be lost (i.e., a lost user device). First user device 155 may be reported to be lost to the venue administrator. First user device 155 may also determine that it is lost and activate a lost mode. However, first user device 155 in the lost mode may not know that that the ranging message would be detected by another device or the venue administrator. First user device 155 may also weigh a cost of sending the ranging messages to a risk of battery drain in the lost mode. In that case, the venue administrator may activate an OOB lost mode at venue 105. For example, location server 190 may broadcast the OOB lost mode information at venue 105. First user device 155 which may be in the lost mode may activate the ranging message transmission in response to detecting broadcast comprising the OOB lost mode. First user device 155 may thus become detectable by the venue administrator.

In venue 105 or in some other venue, the DL mode of UWB may be activated, allowing plurality of user devices 150 to detect the anchor-to-anchor messages and use them to find their position at venue 105. However, restricted areas may only allow authorized user devices to use the location tracking service in the DL mode. In these restricted areas, the anchor-to-anchor communication may be encrypted, thus obfuscating exchanged timestamps. The obfuscation may leverage a dynamic Scrambled Time Sequence (STS) or another encryption method.

First AP 115 authorized to range in the DL mode may establish a connection with location server 190, may provide the user device identification information, then may retrieve a series of keys in use for ranging for a next interval at venue 105. The connection may be performed using Bluetooth connectivity or Wi-Fi connectivity. The series of keys may then be returned over a secure channel and fed into the fine ranging enabled application of first user device 155. A non-authorized user device may fail to obtain the series of keys and may be prevented from ranging. The non-authorized user device may be prevented from obtaining the location of plurality of UWB anchors 130 (e.g. 2-layered map, one layer representing the floorplan, and accessible to all, another layer representing plurality of UWB anchors 130 and their location, and accessible only to authorized user devices).

In other embodiments, location server 190 may allow for differential accuracy in the location provider to plurality of user devices 150. The anchors may exchange a non-encrypted version of their messages, but with a reduced timestamp accuracy (shorter floating point). The encrypted version of the messages may use a more accurate timestamp. Authorized user devices, for example, first user device 155 may therefore compute location with a high level of accuracy (e.g., ten centimeters or less) while other user devices may only obtain general location (e.g., four meters approximation).

Figure 4:
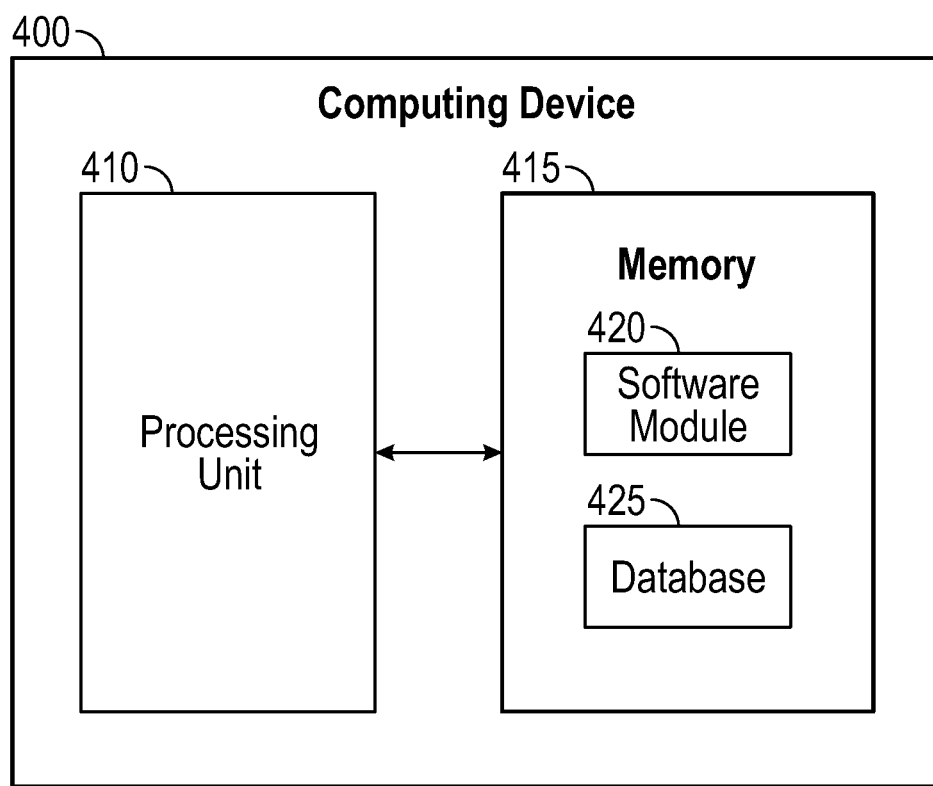
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for receiving location information from plurality of user devices 150 in UWB as described above with respect to FIG. 2 and processes for providing location tracking information in UWB as described above with respect to FIG. 3. Computing device 400, for example, may provide an operating environment for plurality of APs 110, plurality of UWB anchors 130, plurality of user devices 150, control device 180, controller 185, or location server 190. Plurality of APs 110, plurality of UWB anchors 130, plurality of user devices 150, control device 180, controller 185, and location server 190 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   broadcasting a location tracking information for a venue, wherein broadcasting the location tracking information comprises:
      notifying a user device that a location information is expected from the user device, and
      providing an entity identity of an entity seeking the location information from the user device;
   receiving a ranging message from the user device in response to the user device detecting broadcast comprising the location tracking information wherein receiving the ranging message from the user device comprises receiving the ranging message comprising a first random Media Access Control (MAC) address for a first time duration;
   determining a position of the user device on the venue from the ranging message;
   not receiving the ranging message for a second time duration after end of the first time duration; and
   receiving the ranging message comprising a second random MAC address for a third time duration after an end of the second time duration.

2. The method of claim 1, wherein broadcasting the location tracking information further comprises broadcasting a location tracking type information comprising an Uplink (UL) mode.

3. The method of claim 1, wherein receiving the ranging message comprises receiving a One Way Ranging (OWR) message from the user device.

4. The method of claim 1, wherein broadcasting the location tracking information comprises broadcasting the location tracking information in an Out of Band (OOB) signal frequency range.

5. The method of claim 4, wherein broadcasting the location tracking information in the OOB signal frequency range comprises broadcasting the location tracking information in at least one of the following: a Bluetooth Low Energy (BLE) signal frequency range and a Wi-Fi signal frequency range.

6. The method of claim 1, wherein receiving the ranging message from the user device comprises receiving the ranging message on an Ultra-Wideband (UWB) signal frequency range.

7. The method of claim 1, wherein receiving the ranging message from the user device comprises receiving the ranging message from the user device wherein the user device is lost.

8. A system comprising:
   a memory storage; and
   a processing unit coupled to the memory storage, wherein the processing unit is operative to:

broadcast a location tracking information for a venue, wherein the processing unit being operative to broadcast the location tracking information comprises the processing unit being operative to:
  inform a user device that a location information is expected from the user device, and
  provide an entity identity of an entity tracking the location information from the user device;
receive a One Way Ranging (OWR) message from the user device in response to the user device detecting broadcast comprising the location tracking information wherein the processing unit being operative to receive the OWR message from the user device comprises the processing unit being operative to:
  receive the OWR message comprising a first random Media Access Control (MAC) address for a first time duration;
  not receive the OWR message for a second time duration after end of the first time duration; and
  receive the OWR message comprising a second random media access control address for a third time duration after end of the second time duration; and
determine a position of the user device on the venue from the OWR message.

9. The system of claim 8, wherein the processing unit being operative to broadcast the location tracking information comprises the processing unit being operative to broadcast a location tracking type information.

10. The system of claim 8, wherein the processing unit being operative to broadcast the location tracking information comprises the processing unit being operative to broadcast the location tracking information in one of the following: a Bluetooth Low Energy (BLE) signal frequency range and a Wi-Fi signal frequency range, and wherein the processing unit being operative to receive the OWR message comprises the processing unit being operative to receive the OWR message from the user device in an Ultra-Wideband (UWB) signal frequency range.

11. A method comprising:
  receiving, by a user device, a location tracking information for a venue;
  receiving, by the user device, an entity identity of an entity requesting the location tracking information for the venue;
  determining, by the user device, an association between the entity identity and a device entity identity, wherein the device entity identity is stored on the user device; and
  sending, by the user device, a One Way Ranging (OWR) message based on the determined association wherein determining the association between the entity identity and the device entity identity comprises determining that the user device is registered with the entity requesting the location tracking information, and wherein sending the OWR message further comprises:
    generating a first random Media Access Control (MAC) address in response to determining that the user device is registered with the entity requesting the location tracking information; and
    sending the OWR message comprising the first random MAC address for a first time duration;
  not sending the OWR message for a second time duration after end of the first time duration;
  generating a second random MAC address; and
  sending the OWR message comprising the second random MAC address for a third time duration after end of the second time duration.

12. The method of claim 11, wherein:
  determining the association between the entity identity and the device entity identity comprises determining that the user device is an asset of the entity requesting the location tracking information; and
  sending the OWR message comprising user device identification information in response to determining that the user device is the asset of the entity requesting the location tracking information.

13. The method of claim 11, further comprising:
  receiving rewards based on a length of the first time duration.

14. The method of claim 11, wherein the location tracking information is received in one of the following: a Bluetooth Low Energy (BLE) signal frequency range and a Wi-Fi signal frequency range, and wherein the OWR message is sent in an Ultra-Wideband (UWB) signal frequency range.

15. The method of claim 11, wherein the user device is a lost user device.

* * * * *